United States Patent [19]

Francel et al.

[11] 4,120,678
[45] Oct. 17, 1978

[54] SEALING GLASS VEHICLE AND COMPOSITION AND METHOD FOR MAKING SAME

[75] Inventors: Josef Francel; James E. King, both of Toledo; John M. Woulbroun, Grand Rapids, all of Ohio

[73] Assignee: Owens-Illinois, Inc., Toledo, Ohio

[21] Appl. No.: 810,150

[22] Filed: Jun. 27, 1977

Related U.S. Application Data

[60] Division of Ser. No. 637,351, Dec. 3, 1975, Pat. No. 4,038,091, which is a division of Ser. No. 516,900, Oct. 22, 1974, Pat. No. 3,973,975, which is a continuation-in-part of Ser. No. 246,316, Apr. 21, 1972, abandoned, and a continuation-in-part of Ser. No. 511,202, Oct. 1, 1974, Pat. No. 3,967,973, which is a continuation of Ser. No. 246,316.

[51] Int. Cl.$^2$ .............................................. C03C 27/00
[52] U.S. Cl. .......................................... 65/32; 65/36; 65/43
[58] Field of Search ................................ 65/43, 32, 36

[56] References Cited

U.S. PATENT DOCUMENTS

| 3,120,433 | 2/1964 | Van Zee .................................. 65/43 |
| 3,926,709 | 12/1975 | Ward et al. ............................. 65/36 |
| 4,058,387 | 11/1977 | Nofziger ................................. 65/32 |

*Primary Examiner*—S. Leon Bashore
*Assistant Examiner*—Frank W. Miga
*Attorney, Agent, or Firm*—Steve M. McLary; Myron E. Click; David H. Wilson

[57] ABSTRACT

A sealing glass and a sealing glass paste for sealing the face plate and funnel portion of a color television tube wherein PbO-containing sealing glass frit contains from an effective amount of a powder, such as $Pb_3O_4$ powder, which powder prevents the reduction of PbO to Pb metal during the sealing process, which reduction would otherwise result in a dielectric breakdown in the seal. A sealing glass paste consisting essentially of a $PbO-B_2O_3-ZnO$ sealing glass frit and containing an effective amount of said powder, based upon the weight of the frit, together with hydroxypropyl cellulose binder for the frit and a solvent for the binder. A method for sealing the face plate of a color television tube to its funnel portion with a PbO-containing solder glass wherein the reduction of PbO to metallic lead during the sealing step is obviated by the addition of a sufficient amount of $Pb_3O_4$ or $BaO_2$ powder in the solder glass and paste made therewith, which $Pb_3O_4$ or $BaO_2$ is slowly reduced to a lower oxide in a reducing atmosphere during the sealing of the television tube components. A method for increasing the dielectric properties of a PbO-containing sealing glass paste and the devitrified seal made therefrom, which seals the face plate to the funnel of a color television tube, to a value greater than that provided by the solder glass, per se, by incorporating in the solder glass and the solder glass paste made therefrom a small but sufficient amount of $Pb_3O_4$ or $BaO_2$ to accomplish this purpose. A vehicle for a glass frit comprises hydroxypropyl cellulose as a binder and a solvent for said binder.

4 Claims, No Drawings

SEALING GLASS VEHICLE AND COMPOSITION AND METHOD FOR MAKING SAME

This application is a division of Ser. No. 637,351, filed Dec. 3, 1975, now U.S. Pat. No. 4,038,091, issued July 26, 1977; said Ser. No. 637,351 is a division of Ser. No. 516,900, filed Oct. 22, 1974, now U.S. Pat. No. 3,973,975, issued Aug. 10, 1976; said Ser. No. 516,900 is a continuation-in-part of Ser. No. 246,316, filed Apr. 21, 1972, now abandoned, and a continuation-in-part of Ser. No. 511,202, filed Oct. 1, 1974, now U.S. Pat. No. 3,967,973, issued July 6, 1976; said Ser. No. 511,202, being a continuation of Ser. No. 246,316. The entire disclosures of Ser. Nos. 246,316, and 511,202 are relied upon and incorporated herein by reference.

PbO-containing sealing glasses, and particularly $PbO-B_2O_3-ZnO$ sealing glasses, are most commonly used commercially to seal the glass face plate to the glass funnel of a color television tube. Such sealing glasses have the property of melting and flowing at low temperatures, i.e. usually below 500° C. and preferably below 475° C., which facilitates the wetting of the glass surfaces to be sealed. Furthermore, the devitrified or crystallized seal which is formed has a fiber softening point which is higher than that of the original sealing glass. Because of the ready reduction of the PbO in the sealing glass to metallic lead when the sealing is done in a reducing atmosphere or in the presence of deleterious organic vapors, special precautions must be taken by television tube manufacturers to prevent any such reduction of PbO and the dielectric breakdown of the seal caused thereby.

Before the glass face plate of a color television tube can be sealed to the glass funnel portion, both members must first undergo a number of different processing steps. The face plate and the metal grid or perforated mask which will form an integral portion of the inner surface of the face plate are first mated and then subjected to a compaction process wherein the mated parts are heated at a rate of about 10° C. per minute to a temperature of from about 450°–460° C. and held at this temperature for about 2 hours. This compaction process normalizes the shifting which would otherwise occur between the two components during subsequent heating and cooling steps encountered in the formation of the completed television tube. After the components are cooled, the grid or perforated mask is removed and marked for subsequent mating with the same glass face plate.

The face plate is then subjected to the separate application of the green, blue and red phosphors by known techniques and, in some instances, to the application of a carbon or graphite background surrounding the phosphors and providing a sharp contrast thereto. The phosphors are present as a multiplicity of individual dots in an ordered arrangement on the inner surface of the face plate. A resinous or plastic film may be applied to the surface of the phosphors and the inner surface of the face plate is subsequently aluminized, i.e. a thin aluminum film is deposited under vacuum, so that an electrically conductive surface is formed. This aluminized surface is connected to a metal stud on the inner surface of the face plate which stud, in turn, is connected by means of spring clips, which bridge the sealed surface of the face plate, to the electrically conducting inner surface of the funnel. Such inner surface is in turn connected to the anode button on the outer surface of the funnel and thus to the high voltage supply source of the television set.

After the aluminizing step is completed the grid or perforated mask is inserted in the face plate and mated thereto. At least about nine different organic compounds have usually been applied to the inner surface of the face plate at this point and these compounds must be subsequently baked onto the face plate or face panel. Various organic vapors are given off during the baking process which usually occurs at a temperature of from 400°–450° C. Since such organic vapors are deleterious to the PbO present in the sealing glass used to seal the face plate to the funnel, the baking step must be performed prior to any such sealing. If such vapors were permitted to contact the sealing glass during the sealing process they would reduce the PbO to metallic lead and cause a dielectric breakdown in the resultant seal. Such a tube is unacceptable for use and is rejected when it fails the voltage test to which it is submitted at the plant. To salvage the face plate and funnel of the rejected tube in order to use these components to make another tube, the sealing glass is partially etched and then the tube is open by thermal cycling, the face plate and funnel are separated, the solder glass is cleared from each component, the deposited phosphors and other materials are removed from the face plate, and the two components are again processed. This procedure is both time consuming and costly to the television tube manufacturer. Since the high voltages present in a television tube during its operation in a television set are from 20K volts to 35K volts and higher, any dielectric breakdown in the seal between the funnel and face plate will result not only in a malfunction of the tube but creates a potential hazard for anyone coming in contact with the tube.

Thus, as described above, between the time the metal grid or perforated mask is mated to the face plate and the plate is subsequently sealed with a sealing or solder glass to the funnel, the face plate must undergo from about eight to about twelve separate processing operations including inspections, baking, cleaning of various components after various treatments, including further inspections, etching the edge of the face plate which is to be sealed to the funnel, etc. Elimination of any or all of the steps between the insertion of the mask in the face plate and the sealing of the face plate to the funnel would result in a saving of labor and time and would appreciably decrease the cost of manufacturing the completed color television tube. However, because of the formation of organic vapors during the baking steps to which the face plate must be subjected, it has not been possible for the television tube industry to simultaneously bake the face plate and seal the face plate to the funnel using a PbO-containing sealing glass, without reducing the PbO in the sealing glass to Pb metal.

Furthermore, the only binder material which has been used successfully commercially for PbO-containing sealing glasses, such as the $PbO-B_2O_3-ZnO$ sealing glasses, has been a 1 to 1.4% solution of nitrocellulose in amyl acetate as the preferred solvent therefor. Other binders which have been tried in place of nitrocellulose do not prevent the reduction of the PbO in the sealing glass to Pb metal, during the sealing process. Thus, instead of a yellow seal being formed by the devitrified solder glass, a gray or gray-black seal is formed, indicating the presence of metallic lead. Nitrocellulose, however, has many disadvantages when used as a binder for the sealing glass. First, the paste containing such a binder is unstable and has a life of about 4 hours. This means that the color television tube manufacturer has to formulate the paste just prior to its application from a dispensing apparatus onto and about the peripheral sealing edge of the funnel. A batch of no more than about 20 lbs. is prepared and placed in the dispensing apparatus. Furthermore, careful control must be exercised in dispersing the ribbon or bead of sealing glass paste from the orifice of the dispersing apparatus onto and completely about the periphery of the funnel edge. The operator of the dispensing machine must continuously adjust the pressure at which the paste is being extruded in order to maintain the weight and the width of the ribbon substantially uniform. The ribbon width must be less than the width of the funnel edge, since too great a width results in too much of the paste being squeezed out from between the adjoining surfaces of the funnel and face plate during the sealing process. Too narrow a width results in insufficient paste being present to produce an effective and acceptable seal.

It has been noted that in many commercial applications of PbO-containing solder glass pastes having nitrocellulose as the binder, there is a tendency for the width of the extruded ribbon and the weight of the ribbon being extruded for a given length to vary appreciably and as early as the extrusion of the ribbon on the third funnel. This means that an operator must constantly be attending the dispensing apparatus and making the necessary adjustments.

A 20 lb. sealing glass batch is sufficient to seal approximately 100 television tubes having a 23 inch diagonal measurement, in approximately 2 hours or 175 18 inch tubes in about 3 hours. The dispensing apparatus must then be shut down, the tank for the sealing glass paste must be removed, the residual paste remaining, usually 120 to 300 grams, must be removed therefrom and discarded, the tank cleaned and a new 20 lb. paste batch which has been freshly formulated is added thereto. The tank is then again connected to the dispensing apparatus, the air hoses connected, the tank sealed, to prevent loss of amyl acetate which would volatilize at room temperature, the air pressure is adjusted and the operator then again begins extruding the paste onto the peripheral edge of a television funnel. Use of 20 lb. batches and the continuous attention of an operator to the dispensing of the sealing glass ribbon, combined with the periodic shutting down of the equipment, formulation and addition of a new sealing glass batch, starting up and adjusting of the apparatus, and the like, is a costly procedure which is being followed today by almost all manufacturers of color television tubes, simply because they have been unable to dispense with the use of nitrocellulose as the binder for the sealing glass frit. The manufacturers have continued to live with the nitrocellulose limitations and disadvantages because it does eliminate the dielectric breakdown of the sealing glass caused by the reduction of PbO in that glass by the reducing conditions resulting from the use of other binders. Furthermore, such manufacturers have continued to separately bake out the face plate containing the phosphors prior to sealing the glass face plate to the glass funnel, since the organic vapors formed during the baking step would otherwise reduce the PbO of the sealing glass to Pb metal and cause a dielectric breakdown, resulting in a rejection of the tube.

It has now been discovered that if there is present in a PbO-containing sealing glass frit and the sealing glass paste made therefrom a sufficient amount of a powder of a higher oxide of a metal, which metal is ordinarily present in the sealing glass in its lower oxide form, such as PbO, BaO, or the like, and such higher oxide of the metal does not decompose at the temperatures to which the sealing glass is heated, softened and melted to seal the face plate to the funnel, any reducing agent in contact with such a sealing glass during the time the sealing glass is melting and sealing, reduces the higher oxide of the metal to the lower oxide rather than reduce the PbO in the sealing glass to Pb metal. It has further been discovered that $Pb_3O_4$, when added to a PbO-containing sealing glass as a powder in an amount of from at least 0.1 to about 1.5% by weight of the sealing glass, but preferably from about 0.25 to 0.7% by weight, prevents the reduction of the PbO in the sealing glass to metallic Pb. The $Pb_3O_4$ is reduced to PbO and the small amount of PbO produced does not affect the properties of the sealing glass.

Use of $Pb_3O_4$ powder in the PbO-containing sealing glass will enable the manufacturer of color television tubes to avoid chemical degradation of the sealing glass resulting from exposure of the sealing glass to vapors generated from various organic constituents applied to the interior surface portions of the television tube and television tube components.

Furthermore, it has been discovered that the use of $Pb_3O_4$ powder, in such small amounts, in the sealing glass and the paste made therewith, permits the use of a small amount of hydroxypropyl cellulose binder with the nitrocellulose binder. The presence of the former, even in small amounts of a 5 to 30 weight percent nitrocellulose solution, results in a very stable sealing glass paste which can be made up in batches of several thousand pounds, has a shelf life of at least three months and longer and the paste can be used continuously for hours on end in a dispenser therefor without having to adjust the dispensing apparatus, as is presently necessary when nitrocellulose is the sole binder for the glass frit. This results in considerable savings to the manufacturer in terms of labor, down time for the dispenser, formulation time for the paste, etc.

The following examples are merely representative and illustrative of my invention but are in no way to be considered as limiting the invention to the specific examples:

EXAMPLE 1

24 parts by weight of hydroxypropylcellulose, average molecular weight of 60,000, was poured slowly into 150 parts by weight of amylacetate which had previously been heated to 60° C., under continuous stirring. Another 150 parts by weight of amyl acetate were added to the solution and stirred well. 300 parts by weight of ethylene glycolmethyl ether was first heated to 60° C. and slowly added to the solution, stirring continuously. A clear solution of 4% by weight hydroxypropyl cellulose was formed.

5 parts by weight of the 4% hydroxypropylcellulose solution thus formed was thoroughly mixed with 95 parts by weight of nitrocellulose dissolved in amylacetate (1.2% by weight of nitrocellulose in the solvent). The resulting binder was thoroughly mixed with 1170 parts by weight solder glass which contained 0.25% by weight $Pb_3O_4$ powder, as obtained commercially. The solder glass had the following composition in percent by weight: PbO 75.5%, $B_2O_3$ 8.5%, ZnO 12%, $SiO_2$ 2% and BaO 2%.

The solder glass paste which formed was still stable after 50 hours in a dispenser at room temperature. When dispersed as beads on TV funnels and fired at a temperature of about 430° C., the solder glass softened, then flowed and devitrified. The color of the seal was an orange-yellow, indicating that some $Pb_3O_4$ still was present in the seal and had not been completely reduced to PbO no significant variation in width of the extended ribbon was noted after the ribbon had been extruded for several hours onto television funnels.

The hydroxypropyl cellulose comprises 0.195 weight percent of the vehicle employed in this Example.

EXAMPLE 2

100 parts by weight of nitrocellulose solution in an amyl acetate solvent (1.2% by weight nitrocellulose) was mixed with 1170 parts by weight of the solder glass used in Example 1 to form a solder glass paste. The paste was stable for only about 4 hours and, as it was dispensed onto the funnel portion of television tubes, continuous adjustments of pressure had to be made to the dispensing apparatus in order to maintain the bead size substantially uniform in width. Furthermore, variations in the weight of the bead being extruded were encountered varying up to 30% or more of the weight of ribbon desired, and continual adjustments had to be made to the dispensing equipment to control the weight of the ribbon.

EXAMPLE 3

A paste was made up similar to that of Example 2 except that 1230 parts by weight of the solder glass was used. The batch was placed in a dispensing apparatus at the beginning of the extrusion, with a 5.2 psi pressure exerted on the batch, the extruded ribbon had a bead width of 0.213 inches and a weight per unit length of 80.1 gms. At the end of 1 hour, with the same pressure, the extruded bead width was 0.227 inches and the weight per unit length was 101.3 gms., an increase of 26%. At the end of the second hour, with the same pressure on the batch, the bead width had increased to 0.239 inches while the weight per unit length had increased to 117.0, or by 46%. At the end of the third hour the bead width had increased to 0.252 inches and the weight per unit length was now 123.6 gms, or a 54% increase. At the end of the fourth and last hour, the bead width was 0.254 inches and the weight per unit length was 131.9 gms., or a 65% increase. A 30% deviation in weight per unit length is the most that can be tolerated and when more paste is present than can be tolerated, the excess is squeezed out between the sealing faces of the tube and is wasted or, more importantly, can form unwanted stress points which are deleterious to the handling and operation of the tube. Thus, in order to maintain the extruded tube at a width of about 0.213 inches and a weight per unit length of about 80 grams, the operator of the dispenser must be alert to decrease the extrusion pressure periodically during the time the batch is being extruded.

EXAMPLE 4

To 100 parts by weight of the solder glass of Example 1 was mixed 1.5% by weight of $Pb_3O_4$ powder and the resulting solder glass was mixed with 5% by weight hydroxypropyl cellulose having an average molecular weight of about 60,000 and which was dissolved in 95% by weight of equal parts ethylene glycol methylether and amylacetate. The resulting solder glass paste was stable; dispensing very well from the same dispensing apparatus as used in Example 3 without any adjustment being necessary to the extrusion pressure. The variation in the bead or ribbon being dispensed was about ± 0.008 inches. The dielectric strength, volt/0.001 inch or v/mil, of the fired sealing glass was 135% that of the sealing glass frit, per se. It is known that when nitrocellulose binder, per se, is used for the sealing glass, the dielectric strength of the fired sealing glass is from about 100 to 150 v/mil less than that of the sealing glass frit, per se.

The hydroxypropyl cellulose comprises 5 weight percent of the vehicle employed in this Example.

EXAMPLE 5

1.33% solution of hydroxypropylcellulose (avg. mol. weight of about 300,000) in equal parts by weight ethylene glycol methylether and amylacetate was mixed with the sealing glass of Example 1 and which contained 1% by weight $Pb_3O_4$ powder. The ratio of solder glass + $Pb_3O_4$, solids to binder, was 11.3:1. Good dispensing of the resulting paste was obtained together with good bead control. The dielectric strength of the seal produced by the solder glass paste was 25% above that of the glass powder, per se, 80% above that of the glass powder and the standard binder of Example 2 and 150% above that of a solder glass paste formed in accordance with this Example 5 but which did not contain $Pb_3O_4$.

The hydroxypropyl cellulose comprises 1.33 weight percent of the vehicle employed in this Example.

EXAMPLE 6

A solder glass paste was formed by using 11.7 parts by weight solids, (the solder glass of Example 1 plus 0.3% by weight $Pb_3O_4$) with 1 part by weight of a binder consisting of 90% nitrocellulose in amylacetate (1.2% nitrocellulose solution) and 10% of a 4% solution of hydroxypropylcellulose (average 60,000 molecular weight) in equal parts by weight of amylacetate and ethylene glycol methyl ether. After 6 days the paste was still stable. When dispensed as a ribbon thereafter, there was a change in bead width of −0.008 inches from the ribbon extruded at the beginning of the six-day period, using the same extrusion pressure. The weight change per unit length was only +3%.

The hydroxypropyl cellulose comprises 0.4% weight percent of the vehicle employed in this Example.

EXAMPLE 7

9 parts by weight of the solder glass of Example 1 containing 0.5% $Pb_3O_4$ by weight was mixed with 1 part by weight of a binder consisting of 70% by weight nitrocellulose in solution, as disclosed in Example 6, and 30% by weight hydroxypropyl cellulose, also as disclosed in Example 6. After 24 hours, the paste was still stable and suitable for extrusion as a ribbon.

The hydroxypropyl cellulose comprises 1.2% weight percent of the vehicle employed in this Example.

EXAMPLE 8

A sealing glass paste in accordance with the invention was prepared by mixing 1170 parts by weight sealing glass of Example 1 and containing 0.25% $Pb_3O_4$ with 100 parts by weight of a mixture of 90% nitrocellulose binder of Example 6 and 10% hydroxypropyl cellulose binder, also of Example 6. The paste was placed in the same dispensing apparatus as used in Example 3. A ribbon or bead was extruded at a pressure of 2.2 p.s.i. and the bead had a width of 0.255 inches and a weight per unit length of 78.4 grams. At the end of one hour, at the same extrusion pressure, the bead width was 0.267 inches and the weight was 80.4 grams per unit length, a 3% increase. At the end of the second hour, at the same extrusion pressure, the bead width was 0.283 inches and the weight was 83.4 grams per unit length, a 6% increase. At the end of the third hour, the bead width was 0.283 inches and the weight was 84.5 grams, or an 8% increase per unit length. At the end of the fourth hour, the bead width was 0.287 inches and the weight was 85 grams or a 9% increase per unit lenth. The extrusion pressure remained constant at 2.2 p.s.i. throughout the entire extrusion. From the foregoing, it is evident that the variations in bead width and weight per unit length are well within the tolerances established by the television tube industry. Thus, utilizing the sealing glass paste of the invention, the dispensing apparatus can be left unattended for long periods of time, with only an occasional spot check being necessary from time to time, as compared to the constant supervision necessary when utilizing the prior art solder glass paste, as shown in Example 3. Furthermore, the dispensing machines for the solder glass paste ribbons or beads of the invention can be connected to a central solder glass paste supply which continuously feeds the solder glass to the machine. Such dispensing machines can be used continuously for days on end, as compared to the present 20 lb. batch process being used by most commercial color television tube manufacturers today and the frequent down time on such machines which is necessary each time he formulates and uses an additional 20 lb. batch of solder glass paste. It is to be understood that when reference is made to "weight per unit length", above, it is meant to define the length of the ribbon which is extruded completely about the peripheral sealing edge of the funnel portion of the television tube, without overlapping.

EXAMPLE 9

1230 parts by weight of a sealing glass frit containing 0.5% $Pb_3O_4$ was mixed with the binder consisting of 95% nitrocellulose solution (6.2% nitrocellulose in amyl acetate) and 5% of a 4% hydroxypropyl cellulose in equal parts by weight ethylene glycol methyl ether and amyl acetate, to form a sealing glass paste. The sealing glass had the composition: PbO 75%, ZnO 12.6%, $B_2O_3$ 8.3%, $SiO_2$ 2.1%, and BaO 2%, all by weight. The paste was extruded onto funnels for 18 inch television tubes, (18 inches being the diagonal measure of the tube face). A face plate having the mask, phosphor coatings, aluminized coating and the like was mated with each funnel so that the sealing edges of the face plate were in contact with the solder glass ribbon. The mated television parts were then placed in a furnace having no air flow and were heated at a rate of about 10° C. per minute up to a temperature of 450° C. and held there for one hour. The tubes were then allowed to cool at a rate of 7° C. per minute to room temperature. Not only had the face plates been sealed to the funnels of the tubes but each seal between the face plate and funnel had also been exposed to vapors generated from the volatile organic constituents within the interior confines of the face plates and funnels.

Each of the tubes was subjected to a frit breakdown test. A metal ring was placed in contact with the seal about the periphery of the juncture of the face plate and funnel and a 50 KV charge was applied to the anode button on the funnel. Any dielectric breakdown was immediately noted, as well as the area of the breakdown. None of the tubes produced any dielectric breakdown and no current flowed through the seals. However, television tubes sealed with the prior art solder glass and subjected to the same sealing and processing as described above in this Example, suffered from a dielectric breakdown since the PbO in the solder glass was reduced to Pb metal which conducts electricity through the seal.

The hydroxypropyl cellulose comprises 0.2 weight percent of the vehicle employed in this Example.

When reference is made to a PbO-containing solder glass for sealing TV tube face plates to funnels, the art will understand what is meant. Such solder glasses are available commercially. Many are of the $PbO$—$B_2O_3$—$ZnO$ type and come within the following general ranges:

| | |
|---|---|
| PbO | 75–82 |
| ZnO | 7–14 |
| $B_2O_3$ | 6.5–12 |
| $SiO_2$ | 1.5–3 |
| BaO | 0–2 |

Other metal oxides may also be present in amounts, usually less than 5% by weight, as long as such oxides are compatible with the glass and do not materially alter the basic characteristics of the glass or of the devitrified seal formed therefrom.

While nitrocellulose dissolved in amyl acetate is a well-known binder for sealing glasses, the amount of nitrocellulose in solution is usually about 1 to about 1.4%. Nitrocellulose binders can be used with the sealing glass frits of the invention containing $Pb_3O_4$. However, the resulting pastes will be subject to a short shelf life unless from about 5% to about 30% of a hydroxypropyl cellulose solution in a solvent therefor is present as a binder with the nitrocellulose or, preferably, is used as the sole binder for the sealing glass. While a 4% hydroxypropyl cellulose solution has been disclosed as a suitable binder, other solution strengths of this binder may also be used.

The hydroxypropyl cellulose can vary from a molecular weight of about 40,000 to a weight of 300,000 or more. At much higher values, it becomes more difficult to utilize. Other known binders may also be utilized in the sealing glass paste of the invention as long as they perform the function of holding the solder glass frit in a ribbon form for a period of time sufficient to enable the mating pieces, i.e. the face plate and funnel to be joined and sealed. The amount of binder necessary for the paste is that amount which will maintain the solder glass frit in a wet form, extrudable as a bead or ribbon which holds its extruded shape for the necessary length of time, which binder is pyrolyzable upon being subjected to heat below the temperature at which the sealing glass frit is fired, and leaves only a minor amount of residue in the fired frit. About 0.3 to about 1.2% of the nitrocellulose remains in the fired frit, according to thermal gravitation analysis.

Of the solvents which can be used, amyl acetate is preferred because it volatilizes rapidly from the extruded ribbon and the ribbon can more quickly be fired to seal the adjoining glass surfaces. Ethylene glycol methyl ether is also suitable, either per se or in admixture with the amyl acetate. Ethylene glycol ethyl ether, methyl amyl acetate, ethyl hexyl acetate, n-butyl acetate, isobutyl acetate, sec. butyl acetate and diethylene glycol mono-butyl ether acetates are other examples of the many solvents for the binders which can be used.

While the amount of binder which is to be used is that amount which will perform the function of holding the sealing glass frit particles together as an extrudable paste, the amount of sealing glass solids, with the $Pb_3O_4$ included, the binder solution is usually within the range of about 10:1 to about 12.8:1.

The $Pb_3O_4$ is present in the range of about 0.1% to 1.5% although the preferred range is from about 0.25–0.7% with 0.5% giving consistently good results. When 1.5% and more is used, it may be necessary to adjust the solder glass composition to take into account the PbO formed by the reduction of the $Pb_3O_4$.

While $Pb_3O_4$ is disclosed in each of the above examples, $BaO_2$ can be used in lieu thereof, as can other metal oxides having a higher oxygen content than the lower oxide of the corresponding metal found in the sealing glass or which can form a part of the devitrified sealing glass without materially affecting the basic characteristics of the devitrified sealing glass. $BaO_2$ can be reduced to BaO during the time the solder glass is within the firing temperature and is forming the devitrified seal. Reduction of the $BaO_2$ by the reducing atmosphere or by the organic vapors formed during the baking step of the face plate, prevents the simultaneous reduction of PbO to metallic lead and the resultant dielectric breakdown.

It is critical in one embodiment of this invention that the metal oxide having a high oxygen content such as $Pb_3O_4$, be stable at the temperature range to which the sealing glass is fired and does not decompose within the temperature range. This is necessary since the $Pb_3O_4$ must be in the form at which it can be slowly reduced by the reducing atmosphere or the organic vapors, to PbO. If it were to decompose, it could not perform its intended function. Firing temperatures for PbO-containing solder glasses range from about 400°–460° C. with most such glasses being fired at 425°–455° C. to produce the necessary glass flow and then the devitrified seal. $Pb_3O_4$ is stable at temperatures up to 500° C.

While U.S. Pat. No. 3,370,966 granted Feb. 27, 1968 discloses the use of an oxidizing agent in a solder glass for forming a joint between two glass parts, the oxidizing agent must readily decompose to yield free oxygen which will burn out the several adulterants, such as lint, metal particles and the like, usually encountered during the fabrication process. These adulterants otherwise combine with any metallic lead resulting from decomposition of the lead-containing components of the frit. In the case of metallic particles becoming entrapped in the cement, such as aluminum, it will be oxidized to $Al_2O_3$. It will be appreciated that the present invention is completely different from that of U.S. Pat. No. 3,370,966, since the $Pb_3O_4$ must remain as such during the firing temperature to which the sealing glass paste is subjected.

The improvement in the dielectric strength attributable to the presence of $Pb_3O_4$, per se, and in combination with a minor amount of hydroxypropyl cellulose is shown from the following data:

|   |   | Avg.volts/mil |
|---|---|---|
| 1. | Solder glass of Example 1 | 720 |
| 2. | Example 1 solder glass Binder A | 580 |

| | | Avg.volts/mil |
|---|---|---|
| 3. | Example 1 solder glass + 0.25% $Pb_3O_4$ + Binder A | 740 |
| 4. | Example 1 solder glass + 0.25% $Pb_3O_4$ + Binder B | 780 |

Binder A is the 1% solution of nitrocellulose amylacetate.

Binder B is the 95% Binder A plus 5% of the 4% solution of hydroxylpropyl cellulose, avg. molecular weight of 60,000 in equal parts amyl acetate and ethylene glycol methyl ether. Thus, the hydroxypropyl cellulose comprises 0.2 weight percent of the vehicle.

Solder glass pastes of the invention have been made having a dielectric strength of up to twice that of the solder glass, per se.

In the foregoing Examples and experiments, the hydroxypropyl cellulose comprises from 0.195 to 1.2 weight percent of the vehicle when employed with nitrocellulose, and from 1.3 to 5 weight percent of the vehicle when employed as the only binder in the vehicle. More particularly, the vehicles in the foregoing Examples and experiments are comprised of the following ingredients expressed in weight percent:

| hydroxypropyl cellulose | 0.195 | – | 1.2 |
|---|---|---|---|
| nitrocellulose | 0.84 | – | 5.9 |
| amyl acetate | 83.5 | – | 96.45 |
| ethylene glycol methyl ether | 2.4 | – | 14.4 | and

| hydroxypropyl cellulose | 1.3 | – | 5 |
|---|---|---|---|
| amyl acetate | 47.5 | – | 49.3 |
| ethylene glycol methyl ether | 47.5 | – | 49.3 |

While $Pb_3O_4$ and $BaO_2$ are two of the most effective metal oxides, another group of inorganic oxides found to substantially retard the chemical reduction of PbO in PbO-containing sealing glasses comprises metal oxides having thermal decomposition temperatures above about 400° C. Typical of the compounds within this second group are $CrO_3$, $MnO_2$, $Mn_2O_3$, $Fe_2O_3$, $Fe_3O_4$, CuO, $Cu_2O$, $ZrO_2 \cdot xH_2O$, and $Tl_2O_3$. Another group of oxides has been found which is less effective than the first and second groups, but nevertheless yields observable effects in retarding the chemical reduction of PbO. The oxides in this third group are characterized by compounds having a relatively high oxygen content (i.e., a greater number of oxygen atoms than the oxides of the first and second groups), or compounds having relatively high melting points (i.e., relative to the firing temperature of the sealing glass with which it is employed), or a combination of these factors. Typical of the oxides in the third group are $Sb_2O_5$, $TeO_2$, $Ta_2O_5$, $Nb_2O_5$, $V_2O_5$ and $CeO_2$. Another compound within this third group is $Bi_2O_3$. This compound is the least effective in the third group, but still produces some small, observable effects.

A fourth group of oxides which produces an observable effect is characterized by compounds having a thermal decomposition temperature of less than about 400° C. Within this fourth group is $As_2O_5$. These compounds function according to a mechanism which differs from that previously described. The compounds in this fourth group decompose to yield free oxygen within the range of temperatures to which the sealing glass frit is subjected during firing.

In addition to the oxides, it has also been discovered that certain inorganic nitrates can substantially retard the chemical reduction of PbO in a PbO-containing sealing glass. The nitrates can be divided into three groups. The first group produces the most prominent effects, and is characterized by compounds having decomposition temperatures of about 30°–600° C., melting points of about 36°–264° C. and water of hydration. Typical of the compounds within this group are Ca(NO$_3$)$_2$ . 4H$_2$O; Zn(NO$_3$)$_2$ . 6H$_2$O; La(NO$_3$)$_3$ . 6H$_2$O; Bi(NO$_3$)$_2$ . 5H$_2$O; Ce(NO$_3$)$_3$ . 6H$_2$O; Ni(NO$_3$)$_2$ . 6H$_2$O; and Cd(NO$_3$)$_2$ . 4H$_2$O. A second group of nitrates yields results comparable to the compounds of the first group of nitrates, but this second group is characterized by compounds having melting points lower than the firing temperature of the PbO-containing sealing glass, and thermal decomposition temperatures higher than the firing temperature of the PbO-containing sealing glass. Typical of the compounds within this second group are LiNO$_3$ and AgNO$_3$. A third group of nitrates, which is less effective than the first and second groups, yet produces observable effects is characterized by compounds having melting points of about 414°–592° C. Typical of the compounds within this group are CsNO$_3$, Pb(NO$_3$)$_2$ and Ba(NO$_3$)$_2$.

Still another group of inorganic nitrates has been found which is especially effective with sealing glass pastes containing a cellulosic binder. This group is characterized by nitrates which thermally decompose to yield HNO$_3$ at a temperature between about 150° C. and the fiber softening point of the sealing glass. Typical of such compounds are Cu(HO$_3$)$_2$ . 3H$_2$O and BiO(NO$_3$) . H$_2$O. Although the mechanism of operation is not fully understood, it is theorized that these compounds liberate HNO$_3$, which in turn reacts with the cellulosic binder resulting in the formation of a nitrocellulose-type binder, i.e. a cellulose binder having nitro-groups therein. It is known that nitrocellulose binders are not as problematical as, for example, a hydroxypropyl cellulose binder, in chemically reducing the PbO in a PbO-containing sealing glass.

Another group of inorganic compounds which is capable of substantially retarding the chemical reduction of PbO in PbO-containing sealing glasses comprises metal hydroxides which function in the same manner as the oxides. That is, this class of compounds includes hydroxides which are thermally stable at the temperatures to which the sealing glass is fired and do not thermally decompose within the firing temperature range, but which react when exposed to reducing conditions that exist during firing of the sealing glass. Typical of such oxides are LiOH; Li(OH) . H$_2$O; Zn(OH)$_4$; and Ba(OH)$_2$. In the case of the hydroxides, the water of hydration does not appear to have any significant effect. For example, substantially anhydrous lithium hydroxide and hydraded lithium hydroxide yield substantially the same visible effects.

A less effective group of inorganic hydroxides includes hydroxides which thermally decompose at a temperature below the temperature at which the sealing glass seals glass surfaces together. Typical of these compounds is Mg(OH)$_2$.

Still another group of inorganic compounds, which have been discovered to substantially retard the chemical reduction of PbO in PbO-containing sealing glasses, comprises certain metal carbonates. These carbonates can be characterized by compounds which yield carbon dioxide at temperatures above the firing temperature of the sealing glass. Typical of such compounds is MgCO$_3$ which gives very pronounced visible effects.

Another group of carbonates which is less effective than magnesium carbonate includes CdCO$_3$ and ZnCO$_3$. Compounds within this second group lose carbon dioxide within a temperature range of about 300°–500° C., and exhibit greater visible effects when employed with PbO-containing sealing glasses having relatively low firing temperatures, such as 400° C. or lower.

Inorganic oxygen-containing chlorine compounds have also been discovered as suitable additives to a PbO-containing sealing glass frit. While any inorganic, oxygen-containing halogen compound can be employed in this invention, preferably the compound has a thermal decomposition temperature above the firing temperature of the sealing glass. The perchlorates are particularly preferred, especially KClO$_4$.

Still another group of inorganic additives found to be useful in this invention are the dichromates. More particularly, one can employ an effective amount of K$_2$Cr$_2$O$_7$. Generally, any dichromate having a decomposition temperature not more than about −100° or not more than about +100° C., relative to the firing temperature of the PbO-containing sealing glass, can be employed.

Another group of inorganic additives includes persulfates and peroxysulfates having a high oxygen content (e.g., about 7 to 8 oxygen atoms), preferably such compounds having a thermal decomposition temperature higher than about 300° C. K$_2$S$_2$O$_7$ and K$_2$S$_2$O$_8$ have been found to give positive effects.

Surprisingly, it has been discovered that P$_2$O$_5$ does not function properly with a PbO-containing solder glass having a firing temperature above about 400° C. Since P$_2$O$_5$ sublimates at about 300° C., this suggests that the use of materials which sublimate below the firing temperature of the solder glass should be avoided.

A series of tests on a PbO-containing sealing glass frit was conducted to determine the ability of several additives to retard the chemical reduction of the PbO constituent when the sealing glass frit was mixed with a vehicle to form a paste and subsequently fired. The additives are set forth in column 1 of Table I. Each of the additives was admixed with the sealing glass frit to produce test sample admixtures respectively containing 0.2, 0.8, 1.5 or 3% by weight of each of the additives admixed with separate fractions of the sealing glass frit. Each of the resultant samples was then mixed with a sufficient amount of a vehicle to form a paste. One test sample of each additive-sealing glass frit paste at the indicated additive concentrations was then fired at separate temperatures: 400° C., 450° C. or 525° C. These temperature ranges were selected because they cover the typical operating range of interest in the manufacture of color television picture tubes. Following is a summary of the procedure used in conducting the tests.

Microscope slides were prepared by depositing a typical cathode-ray tube sealing glass in paste form with and without the aforementioned additives. The sealing glass, also referred to herein as the "base glass", was a PbO-containing sealing glass having one of the following compositions expressed as oxide percentages by weight:

|  | Glass A | Glass B |
| --- | --- | --- |
| PbO | 75 | 84 |
| ZnO | 12.6 | 2.7 |

-continued

| | Glass A | Glass B |
|---|---|---|
| $B_2O_3$ | 8.3 | 12.3 |
| $SiO_2$ | 2.1 | 0.4 |
| BaO | 2 | 0.6 |

These base glasses were sealing glass frits from which very coarse particles were removed by screening; substantially all of the particles were less than 200 mesh.

A sample of the base glass was applied to each slide using deionized water as a vehicle in order to establish a base line color after firing.

Another sample of the base glass containing 0.8 weight percent additive was applied to each slide to determine the effect of the additive on the base glass.

A sealing glass paste was prepared by mixing 92 parts by weight of base glass with 8 parts by weight of a vehicle. The vehicle comprised 96% by weight nitrocellulose solution (1.2% by weight nitrocellulose in amyl acetate) and 4% by weight of a solution comprising 1.32% by weight hydroxypropyl cellulose having a molecular weight of about 60,000 in Dowanol EM and amyl acetate.

Each of these pastes was prepared by stirring a small quantity of the base glass and appropriate vehicle on a glass plate.

Other pastes were prepared containing additives, base glass and the hydroxypropyl cellulose-nitrocellulose vehicle. The additives were intended to retard the chemical reduction of PbO. Each of these pastes was prepared by mixing a base glass and an additive in a small batch on a paint shaker. The resulting mixtures were than blended with the hydroxypropyl cellulose-nitrocellulose vehicle to form sealing glass pastes containing the additives at concentrations of 0.2, 0.8, 1.5 or 3% by weight.

Each of the pastes was transferred to a glass slide previously cleaned by wiping with acetone. A sample of each of the pastes was applied by depositing a drop of the paste of random size on the glass slide using a spatula. The paste was dried by heating in air at a temperature of about 120° F. for about 3 hours.

Each glass slide was fired in order to seal the sealing glass to the glass slide. Three different firing cycles were employed by varying the peak temperature. The firing cycle involved heating the glass slide in air at 11° C. per minute temperature increase to peak temperature, holding at the peak temperature for 35 minutes, and cooling to room temperature at a rate of 6° C. temperature decrease per minute. The peak temperature was 400° C., 450° C. or 525° C.

The results of these tests appear in Table I. Recognizing that the objective of these tests is to determine the effect of various vehicles and additives on the chemical reduction of PbO, these tests can be interpreted by observing the color of each sample of a fired paste. The formation of free lead or the lower oxides of lead during firing is characterized by a gray or black color in the fired sample unless the additive is black or gray. Favorable results are obtained when any of the samples numbered 4, 5 and 6 in Table I are lighter in color or of a different color than the sample numbered 3 in the Table. The results in Table I are based on visual observations with the unaided eye. Spots and mottled appearance indicate mainly incomplete mixing. More uniform coloration would result from more uniform mixing of the frit and powder additive.

TABLE I

| Additive | Solder Glass | Firing Temp.-° C | #1 Solder Glass Alone | #2 Glass + 0.8% addit. | #3 Glass + Binder | #4 Glass + Binder + 0.2% addit. | #5 Glass + Binder + 0.8% addit. | #6 Glass + Binder + 1.5% (or 3% additive |
|---|---|---|---|---|---|---|---|---|
| $CrO_3$ | A | 400 | yellow | red | black | best | good | some bubbles |
| $CrO_3$ | A | 450 | yellow | red | dark gray | best, good flow | better than #3 | better than #3 |
| $CrO_3$ | B | 400 | dark brownish | orange | black | black but some effect | green, considerable flow | about same as #4 |
| $CrO_3$ | B | 450 | black | red | black | black | green, considerable flow | very dark brown |
| $MnO_2$ | A | 400 | yellow | — | black | dark brown | black | black |
| $MnO_2$ | A | 450 | yellow | black | black | black | light gray-best | gray |
| $MnO_2$ | B | 400 | gray-black | — | black | light gray | dark gray | black |
| $MnO_2$ | B | 450 | gray | gray | black | gray | = #1 | black |
| $Mn_2O_3$ | A | 400 | yellow | black | very dark brown | black | black | black |
| $Mn_2O_3$ | A | 450 | yellow | black | very dark brown | gray-best | dark gray | very dark gray |
| $Mn_2O_3$ | B | 400 | very dark gray | black | = #1 | = #1 | black | jet black |
| $Mn_2O_3$ | B | 450 | very dark gray | very dark gray | black | lighter than #1 — best | black | black |
| $Tl_2O_3$ | A | 450 | yellow | brown | gray | yellow-brown bottom; top black | muddy beige | light gray |
| $Tl_2O_3$ | A | 525 | — | — | gray | — | — | yellow |
| $TeO_2$ | A | 400 | yellow | yellow | very dark brown | light brown | light brown | light brown |
| $TeO_2$ | A | 450 | yellow | brown | gray | gray | gray | gray |
| $TeO_2$ | A | 525 | — | — | gray | — | — | greenish tint on gray; (3% additive) |

TABLE I-continued

| Additive | Solder Glass | Firing Temp.-° C | #1 Solder Glass Alone | #2 Glass + 0.8% addit. | #3 Glass + Binder | #4 Glass + Binder + 0.2% addit. | #5 Glass + Binder + 0.8% addit. | #6 Glass + Binder + 1.5% (or 3% additive |
|---|---|---|---|---|---|---|---|---|
| Ta$_2$O$_5$ | A | 400 | yellow | yellow | black | brown | light brown | light brown |
| Ta$_2$O$_5$ | A | 450 | yellow | yellow-darker than #1 | gray | gray | gray | gray + faint red spots |
| Nb$_2$O$_5$ | A | 400 | yellow | yellow | dark brown | brown | brown | brown |
| Nb$_2$O$_5$ | A | 450 | yellow | orange | gray | gray | gray | gray |
| Nb$_2$O$_5$ | A | 525 | — | — | gray | — | — | (3% additive) gray + faint yellow spots |
| V$_2$O$_5$ | A | 400 | yellow | beige | dark brown | dark brown | dark brown | brown |
| V$_2$O$_5$ | A | 450 | yellow | yellow | gray | gray | gray + faint yellow spots | gray + faint yellow spots |
| V$_2$O$_5$ | A | 525 | — | — | — | — | — | gray + yellow spots (3% addit.) |
| Sb$_2$O$_5$ | A | 400 | yellow | — | dark brown | dark brown | dark brown + faint light spots | dark brown + faint light spots |
| Sb$_2$O$_5$ | A | 450 | yellow | brown | black | black | black + yellow spots | black + yellow spots |
| Sb$_2$O$_5$ | B | 450 | black | gray | black | dark gray | dark gray | = #2 |
| Sb$_2$O$_5$ | B | 400 | dark gray | — | black | = #1 | lighter than #1 | lighter than #1 |
| As$_2$O$_5$ | A | 400 | yellow | yellow | very dark brown | brown | beige-white mottle | light beige-white mottle |
| As$_2$O$_5$ | A | 450 | yellow | orange | gray | gray + brown spots | brown + gray spots | brown + gray spots |
| As$_2$O$_5$ | B | 400 | very dark brown | brown | brown | black | very dark gray | gray |
| As$_2$O$_5$ | B | 450 | black | brown | black | dark gray | gray | gray |
| CeO$_2$ | A | 450 | yellow | yellow | dark gray | gray | gray | gray + red-brown spots (3% addit.) |
| CeO$_2$ | A | 525 | — | — | gray | — | — | gray-lighter than #3 |
| Bi$_2$O$_3$ | A | 450 | yellow | yellow | black | gray | gray | gray |
| Bi$_2$O$_3$ | A | 400 | yellow | yellow | black | brown | brown | brown |
| Ca(NO$_3$)$_2$ . 4H$_2$O | A | 400 | yellow | yellow | black | dark gray | gray | yellow-silver sheen |
| Ca(NO$_3$)$_2$ . 4H$_2$O | A | 450 | yellow | orange | gray | black-gray | yellow + some gray | white + some orange |
| Zn(NO$_3$)$_2$ . 6H$_2$O | A | 400 | yellow | yellow | black | gray | yellow | yellow, some gelling, considerable flow |
| Zn(NO$_3$)$_2$ . 6H$_2$O | A | 450 | yellow | yellow-orange | dark gray | gray + beige | beige | beige, considerable flow |
| La(NO$_3$)$_3$ . 6H$_2$O | A | 400 | yellow | light yellow | black | gray-brown + white spots | gray-brown + white and yellow spots | = #5 + some gelling |
| La(NO$_3$)$_3$ . 6H$_2$O | A | 450 | yellow | yellow-orange | gray | white-gray-orange mottle | white-gray orange mottle | white-orange mottle |
| Bi(NO$_3$)$_2$ . 5H$_2$O | A | 400 | yellow | yellow | black | gray | yellow-gray | yellow - best |
| Bi(NO$_3$)$_2$ . 5H$_2$O | A | 450 | yellow | shiny | black | gray-shiny | shiny, considerable flow | shiny |
| Ce(NO$_3$)$_3$ . 6H$_2$O | A | 400 | yellow | yellow | black | yellow-gray | yellow-gray | yellow-gray |
| Ce(NO$_3$)$_3$ . 6H$_2$O | A | 450 | yellow | orange | gray | gray-yellow | yellow | yellow |
| Ni(NO$_3$)$_2$ . 6H$_2$O | A | 400 | yellow | yellow-brown | dark brown | beige best | beige | beige, lumpy |
| Ni(NO$_3$)$_2$ . 6H$_2$O | A | 450 | yellow | yellow-brown mottled | black | gray-brown | beige + some black spots and bubbles | same as #5 |
| Cd(NO$_3$)$_2$ . 4H$_2$O | A | 400 | yellow | brown | dark brown | gray-brown | white-gray | white-gray |
| Cd(NO$_3$)$_2$ . 4H$_2$O | A | 450 | yellow | yellow-gray | black | black-brown | gray-brown | gray-yellow-brown, best |
| LiNO$_3$ | A | 400 | yellow | yellow | black | black-white mottled | gray-yellow white | yellow-beige |
| LiNO$_3$ | A | 450 | yellow | orange | black | gray-white mottled | light gray-shiny mottled | beige, lumpy |
| LiNO$_3$ | B | 400 | black | beige | black | black-white | black-white | white + some gray, best |

TABLE I-continued

| Additive | Solder Glass | Firing Temp.-° C | #1 Solder Glass Alone | #2 Glass + 0.8% addit. | #3 Glass + Binder | #4 Glass + Binder + 0.2% addit. | #5 Glass + Binder + 0.8% addit. | #6 Glass + Binder + 1.5% (or 3% additive |
|---|---|---|---|---|---|---|---|---|
| LiNO₃ | B | 450 | black | yellow | black | mottled black-yellow | mottled black-yellow | beige + some black specks |
| AgNO₃ | B | 400 | brown | brown + metallic sheen | black | very dark brown + whitening | very dark brown + whitening | very dark brown + whitening |
| AgNO₃ | A | 450 | yellow | gray | gray | gray-beige | beige + gray and brown spots | = #5 |
| AgNO₃ | A | 400 | yellow | dark brown | dark brown | black | brown, best | dark brown |
| CsNO₃ | A | 400 | yellow | yellow | black | brown | brown | brown |
| CsNO₃ | A | 450 | yellow | yellow | gray | gray-brown | dark brown | brown and improving |
| Pb(NO₃)₂ | A | 400 | yellow | — | yellow-dark brown | brown + white spots | light brown gray | brown-white |
| Pb(NO₃)₂ | A | 450 | yellow | shiny | black | jet black | gray-white | gray-white and improving |
| Pb(NO₃)₂ | B | 400 | gray | — | black | black + white spots | gray + more white spots | light gray + white spots |
| Pb(NO₃)₂ | B | 450 | black | yellow | black | gray | black-white-gray-mottled | black-white-gray-mottled |
| Ba(NO₃)₂ | A | 400 | yellow | — | brown | brown | brown + yellow spots | brown + yellow spots |
| Ba(NO₃)₂ | A | 450 | yellow | yellow | black | black + yellow spots | gray + yellow spots | gray + yellow spots |
| Ba(NO₃)₂ | B | 400 | brown | — | black | black | black + yellow spots | black + yellow spots |
| Ba(NO₃)₂ | B | 450 | black | yellow | black | black | black-white mottled | black-white mottled |
| Ba(NO₃)₂ | A | 525 | — | — | gray | — | — | yellow + gray spots (3% addit.) |
| LiOH . H₂O | A | 400 | yellow | shiny-pink | black-brown | light brown + yellow spots | light brown + yellow spots | light brown + yellow spots |
| LiOH . H₂O | A | 450 | yellow | shiny-white mottled | black | brown | gray | gray + orange spots |
| Ba(OH)₂ . 8H₂O | A | 400 | yellow | shiny | black | gray | beige | beige |

In addition to the compounds set forth in Table I, the following additional results were observed. Cupric oxide gave very good results at concentrations of 0.2, 0.8 and 1.5%. Cuprous oxide yields observable effects, but is less effective than cupric oxide. Ferric oxide gave excellent results even at concentrations as low as 0.2% with glass binder A. Ferrosoferric oxide (Fe₃O₄) was less effective than ferric oxide, but nevertheless exhibited observable effects. Zr(OH)₄ and ZrO₂ . H₂O were both effective at higher concentrations, such as the 3% additive level. At a concentration of 1.5%, the latter compound exhibited some orange and yellow coloration. Mg(OH)₂ exhibited some visible effects, but was not as effective as the other hydroxides tested.

Among the other nitrates tested, BiO(NO₃) . H₂O gave excellent results at concentrations of 0.2, 0.8 and 1.5%. Fired samples containing this additive exhibited a white color. Cu(NO₃)₂ . 3H₂O yielded very good results at concentrations of 0.2, 0.8 and 1.5% with sealing glass B. Potassium pyrosulfate gave very good results at 0.8% and 1.5% additive concentrations when employed with either sealing glass A or sealing glass B and fired at 400° C. and 450° C. Potassium peroxydi sulfate was somewhat less effective than the potassium pyrosulfate. Potassium peroxydisulfate-containing samples exhibited some white spots on a gray matrix.

Another compound tested was boric acid (H₃BO₃) which yielded some favorable color effects. This compound is not, however, among the best compounds for retarding the chemical reduction of PbO in a PbO-containing sealing glass.

It is to be noted that the effectiveness of the hydrated compounds is surprising to a person skilled in the art. It would be anticipated that compounds containing water of hydration would lead to the formation of bubbles in the fired sample of the sealing glass. It has been discovered, on the other hand, that some of the hydrated additives are very effective in retarding the chemical reduction of PbO without resulting in the formation of bubbles in the fired sealing glass.

An examination of Table I indicates that the base glass A, which was applied to the glass slide using only deionized water as the vehicle, has a yellow color after firing. With glass B, on the other hand, a gray or black coloration is obtained even in the absence of a cellulosic binder. This is caused by the presence of more PbO in glass B than glass A and the reduction of this PbO to free lead. Thus, while there is no significant PbO-reduction in the base glass A in the absence of an organic, cellulose-containing vehicle, this is not the case with glass B. The problem of PbO-reduction in a frit comprised of glass B is even more serious. It will be apparent from Table I that some of the additives are even effective with a frit comprised of glass B. Use of glass B in the TV industry would be advantageous since it can be fired at a lower temperature because of the higher PbO-content.

When the glass contains a cellulosic binder, it is observed from Table I that some PbO-reduction occurs as evidenced by the black or gray color of the samples numbered 3. In some cases, the gray or black coloration is especially evident when the glass slide is viewed from its underside. As previously mentioned, when these samples are compared with samples numbered 4, 5 and 6, it is apparent that the additive has a positive effect on the retardation of the chemical reduction of PbO.

It will be apparent from the foregoing discussion that, in a broader context, this invention provides a PbO-containing sealing glass frit for sealing two glass surfaces together, wherein the PbO in the sealing glass is prevented from being reduced when the sealing glass is being fired in the presence of reducing conditions at a temperature sufficient to seal the glass surfaces together, by incorporating in the sealing glass an amount of powder sufficient to prevent reduction of the PbO during sealing in the presence of the reducing conditions. The powder is selected from the group consisting of:

(A) A hydroxide or higher oxide of a cation, said hydroxide and oxide being thermally stable at the temperatures at which the sealing glass frit seals the glass surfaces together; the hydroxide and oxide are capable of being chemically reduced when exposed to the reducing conditions;

(B) An inorganic nitrate having a thermal decomposition temperature of about 30°–600° C., a melting point of about 36°–264° C. and containing water of hydration;

(C) An inorganic nitrate having a melting point lower than the firing temperature of the PbO-containing sealing glass and a thermal decomposition temperature higher than the firing temperature of the PbO-containing sealing glass;

(D) An inorganic nitrate having a melting point of about 414°–592° C.;

(E) An inorganic nitrate which is thermally decomposable between about 150° C. and the fiber softening point of the sealing glass to yield $HNO_3$;

(F) An inorganic carbonate which is thermally decomposable to yield carbon dioxide above the temperatures at which the sealing glass frit seals the glass surfaces together;

(G) An inorganic, oxygen-containing chlorine compound having a thermal decomposition temperature above the temperatures at which the sealing glass seals the surfaces together; and (H) An inorganic dichromate having a decomposition temperature of not more than about 100° C. above to 100° C. below the temperatures at which the sealing glass frit seals the glass surfaces together.

The powder and its products after firing are compatible with the fired sealing glass.

The powder is present in the frit in an amount sufficient to prevent chemical reduction of the PbO during sealing of the PbO sealing glass in the presence of reducing conditions. Typically, the powder is present in the frit in an amount of about 0.1–3 weight percent, although an amount of about 0.2–1.5 weight percent is preferred. When the smaller proportions are employed, it may be unnecessary to adjust the solder glass composition to take into account the powder and products resulting therefrom after firing.

Additionally, this invention provides a sealing glass paste comprising a PbO-containing sealing glass frit, a binder for the frit and a solvent for the binder. The PbO in the sealing glass frit is prevented from being reduced when the sealing glass frit is being fired in the presence of reducing conditions at a temperature sufficient to seal the sealing glass frit. The sealing glass paste also has present with the sealing glass frit an amount of a powder sufficient to prevent reduction of the PbO during sealing of the sealing glass frit. The powder is selected from the group consisting of:

(A) A hydroxide or a higher oxide of a cation which is thermally stable at the temperatures at which the sealing glass frit seals the glass surfaces together; the hydroxide and oxide are capable of being chemically reduced when exposed to the reducing conditions;

(B) An inorganic oxide having a thermal decomposition temperature of less than about 400° C.;

(C) An inorganic nitrate having a thermal decomposition temperature of about 30°–600° C., a melting point of about 36°–264° C. and containing water of hydration;

(D) An inorganic nitrate having a melting point lower than the firing temperature of the PbO-containing sealing glass and a thermal decomposition temperature higher than the firing temperature of the PbO-containing sealing glass;

(E) An inorganic nitrate which is thermally decomposable between about 150° C. and the fiber softening point of the sealing glass to yield $HNO_3$;

(F) An inorganic nitrate having a melting point of about 414°–592° C.;

(G) Potassium nitrate;

(H) An inorganic carbonate which is thermally decomposable to yield carbon dioxide;

(I) An inorganic, oxygen-containing chlorine compound;

(J) An inorganic dichromate having a decomposition temperature of not more than about 100° C. above to about 100° C. below the temperatures at which the sealing glass frit seals the glass surfaces together;

(K) $H_3BO_3$;

(L) An inorganic peroxysulfate or peroxydisulfate; and (M) An inorganic hydroxide having a thermal decomposition temperature below the temperatures at which the sealing glass frit seals the glass surfaces together. Again, the powder and the products resulting therefrom after firing are compatible with the fired sealing glass. The aforementioned proportions are also applicable to this embodiment of the present invention.

The sealing glass paste of this invention can also contain an organic or inorganic acid in an amount sufficient to prevent gelling of the paste on aging. This can be accomplished by adding the acid in an amount sufficient to maintain an acid pH in the paste. Generally, only very small additions are required. A particularly preferred acid is citric acid. Citric acid additions of about 10–15 grams per 440 lbs. of sealing glass frit have been found effective in preventing gel formation. The use of such an acid is also advantageous in that it permits closer control of bead width and allows the use of more constant dispensing pressure when the sealing glass is applied to surfaces that are to be sealed together. Other acids, such as tartaric, phosphoric and sulfuric acids, can also be employed. Optimum amounts can be determined with a minimum of experimentation.

We claim:

1. In a method of sealing two glass surfaces together with a paste of PbO-containing sealing glass frit in the presence of reducing conditions in such manner as to prevent the tendency of the PbO to be reduced and a dielectric breakdown to occur in the seal formed between said glass surfaces, the improvement wherein said PbO in said sealing glass frit remains unreduced in the presence of said reducing conditions and said dielectric breakdown is prevented, said improvement comprising incorporating an effective amount of $BaO_2$ powder in said paste.

2. A method as defined in claim 1, wherein said PbO-containing sealing glass frit consists essentially of:

| CONSTITUENTS | PERCENT BY WEIGHT |
|---|---|
| PbO | 75 – 82 |
| ZnO | 7 – 14 |
| $B_2O_3$ | 6.5 – 12 |
| $SiO_2$ | 1.5 – 3.11 |

3. The method of sealing the face plate portion of a color television tube to the funnel portion of the tube with a PbO-containing sealing glass in the presence of organic vapors capable of reducing the PbO in said sealing glass, comprising the steps of:

(a) applying between the sealing edges of said face plate portion and said funnel portion a PbO-containing sealing glass frit having incorporated therein an effective amount of $BaO_2$ powder, and (b) subjecting said face plate portion and said funnel portion and said sealing glass frit to a temperature sufficient to seal said face plate portion and said funnel portion but below the thermal decomposition temperature of said $BaO_2$ and without reducing said PbO in said sealing glass.

4. The method as defined in claim 3, wherein said PbO-containing sealing glass consists essentially of:

| CONSTITUENTS | PERCENT BY WEIGHT |
|---|---|
| PbO | 75 – 82 |
| ZnO | 7 – 14 |
| $B_2O_3$ | 6.5 – 12 |
| $SiO_2$ | 1.5 – 3.11 |

* * * * *